United States Patent
Bhasin et al.

(10) Patent No.: US 8,577,976 B2
(45) Date of Patent: Nov. 5, 2013

(54) APPLICATION OF SYSTEM LEVEL POLICY IN MESSAGE ORIENTED MIDDLEWARE

(75) Inventors: Rohit Bhasin, Southampton (GB); Martin J. Gale, Eastleigh (GB); Matthew I. Roberts, Southampton (GB)

(73) Assignee: International Business Machines Corporation, Armonk, NY (US)

(*) Notice: Subject to any disclaimer, the term of this patent is extended or adjusted under 35 U.S.C. 154(b) by 257 days.

(21) Appl. No.: 13/095,816

(22) Filed: Apr. 27, 2011

(65) Prior Publication Data

US 2012/0005286 A1    Jan. 5, 2012

(30) Foreign Application Priority Data

Apr. 27, 2010    (EP) .................................... 10161193

(51) Int. Cl.
*G06F 15/16* (2006.01)

(52) U.S. Cl.
USPC ........................................................ 709/206

(58) Field of Classification Search
USPC .................. 709/206, 220–221, 223–226; 379/93.01–93.37
See application file for complete search history.

(56) References Cited

U.S. PATENT DOCUMENTS

| | | | |
|---|---|---|---|
| 6,507,875 B1 * | 1/2003 | Mellen-Garnett et al. | 719/310 |
| 6,658,485 B1 * | 12/2003 | Baber et al. | 719/314 |
| 7,322,033 B2 * | 1/2008 | Ito | 718/104 |
| 7,934,028 B1 * | 4/2011 | Leonard et al. | 710/56 |
| 8,346,929 B1 * | 1/2013 | Lai | 709/226 |
| 2009/0036750 A1 * | 2/2009 | Weinstein et al. | 600/300 |
| 2009/0116380 A1 * | 5/2009 | Santiago et al. | 370/229 |

OTHER PUBLICATIONS

United States Patent and Trademark Office, Office Action for U.S. Appl. No. 13/434,542, Mar. 12, 2013, pp. 1-15, Alexandria, VA, USA.

* cited by examiner

*Primary Examiner* — Ruolei Zong
(74) *Attorney, Agent, or Firm* — Lee Law, PLLC; Christopher B. Lee

(57) ABSTRACT

One or more policies to be applied to a set of one or more messages in a message oriented middleware are defined. Metrics of the message oriented middleware are monitored. Application of a policy in response to a trigger condition being satisfied is initiated. Application of the policy applies actions across the set of one or more messages.

16 Claims, 4 Drawing Sheets

APPLICATION OF SYSTEM LEVEL POLICY IN MESSAGE ORIENTED MIDDLEWARE

RELATED APPLICATIONS

This application claims priority to and claims the benefit of European Patent Application Serial No. EP10161193.7 titled "Application of System Level Policy in Message Oriented Middleware," which was filed in the European Patent Office on Apr. 27, 2010, and which is incorporated herein by reference in its entirety.

BACKGROUND

This invention relates to the field of message oriented middleware. In particular, the invention relates to application of system level policy in message oriented middleware (MOM).

Traditionally, quality of service (QoS) is expressed at the level of the individual event or quantum of data, usually by the entity that generates the data. For example:

In message oriented middleware, a message is sent as "Persistent," and the decision is made by the sender of the message;

In the traditional postal service, the sender of a letter chooses to send it as first (1st) Class or second (2nd) Class;

In email systems, the sender of an email decides whether the email is "Urgent," "Confidential," or "Encrypted;" and A passenger booking a flight chooses whether to fly standard class, business or first class.

BRIEF SUMMARY

According to a first aspect of the present subject matter, there is provided a method for application of system level policy in message oriented middleware, comprising: defining one or more policies to be applied to a set of one or more messages in the message oriented middleware; monitoring metrics of the message oriented middleware; initiating application of a policy in response to a trigger condition being satisfied; and where application of the policy applies actions across the set of one or more messages.

According to a second aspect of the present subject matter, there is provided a computer program product for application of system level policy in message oriented middleware comprising a computer-readable storage medium in which computer-executable instructions are stored, which instructions, when executed by a computer, cause the computer to: define one or more policies to be applied to a set of one or more messages in the message oriented middleware; monitor metrics of the message oriented middleware; initiate application of a policy in response to a trigger condition being satisfied; and, where application of the policy applies actions across the set of one or more messages.

According to a third aspect of the present subject matter, there is provided a system for application of system level policy in message oriented middleware, comprising: a messaging server; a monitoring component that monitors metrics of the message oriented middleware; a determining component that initiates application of a defined policy in response to a trigger condition being satisfied; and, where application of the defined policy applies actions across a set of one or more messages.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

DETAILED DESCRIPTION

Figure 1:
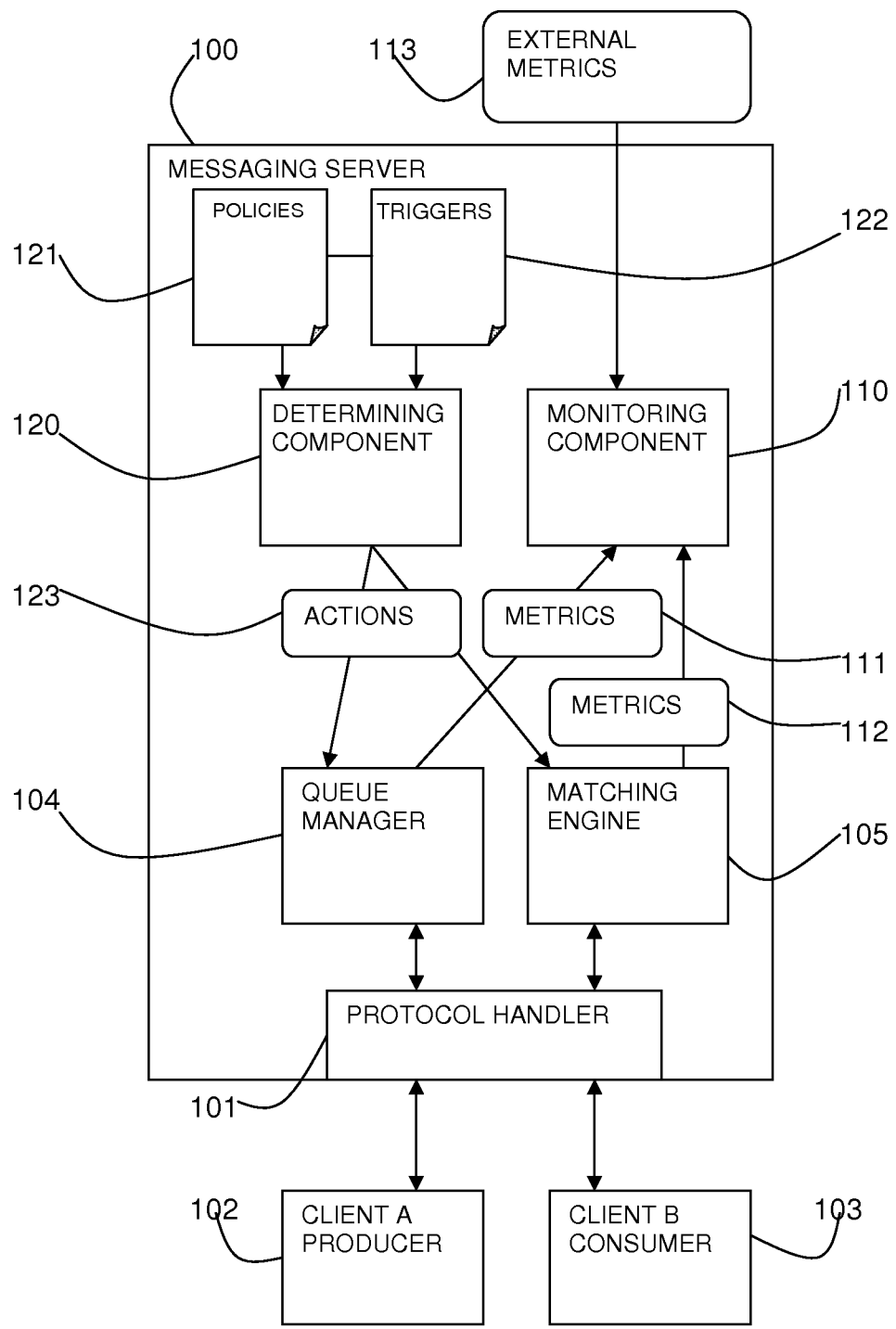
FIG. 1 is a block diagram of a system in accordance with the present invention.

It will be appreciated that for simplicity and clarity of illustration, elements shown in the figures have not necessarily been drawn to scale. For example, some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the present subject matter. However, it will be understood by those skilled in the art that the present subject matter may be practiced without these specific details. In other instances, certain methods, procedures, and components have not been described in detail so as not to obscure the present description.

It was recognized that, while the traditional QoS approach is able to satisfy a number of scenarios, it has a number of key weaknesses. For example, such QoS policies are unable to take into account the wider context in which the data exists, such as, at points of data storage or changes in the usage pattern of the application for which the data is intended. It was also recognized that it is common within traditional QoS for the sender to nominate a higher QoS than might strictly be necessary as a result of the limited view that they have of the system, such as sending a message oriented middleware (MOM) message with the strongest persistence setting and setting it to never expire. Conventionally, quality of service or reliability constraints are applied to individual messages by the application that sends the messages. Once the message has been sent (or in some cases more accurately described as having been accepted/stored by the server) the quality of service cannot be altered.

The present subject matter improves on conventional QoS by applying system level policy in a message oriented middleware rather than for an individual message in the system. The present subject matter also allows modifying of the quality of service (QoS) after the message has been stored in response to policy constraints triggered by the fulfillment of a condition.

Message-oriented middleware (MOM) is an infrastructure focused on sending and receiving messages that increases the interoperability, portability, and flexibility of an application by allowing the application to be distributed over heterogeneous platforms. MOM reduces the complexity of developing applications that span multiple operating systems and network protocols by insulating the application developer from the details of the various operating system and network interfaces. API's that extend across diverse platforms and networks are typically provided by MOM.

MOM is software that resides in both portions of client/server architecture and typically supports asynchronous calls between the client and server applications. Message queues provide temporary storage for messages. MOM reduces the involvement of application developers with the complexity of the master-slave nature of the client/server mechanism.

MOM comprises a category of inter-application communication software that generally relies on asynchronous message-passing. Most message-oriented middleware depend on a message queue system, but there are some implementations that rely on broadcast or multicast messaging systems.

A message provider such as, for example, WebSphere MQ or WebSphere Server Application (WAS) Service Integration Bus (WebSphere and MQ are trademarks of International Business Machines Corporation) may be augmented with quality of service applied to a set of one or more messages at a system level.

Referring to FIG. 1, a block diagram shows an example of a messaging server 100. In one example, the messaging server 100 may be a message broker that translates a message from the formal messaging protocol of the sender to the formal messaging protocol of the receiver in a telecommunication network where programs communicate by exchanging formally-defined messages. In another example, the messaging server 100 may be the queue manager portions of a message broker.

The messaging server 100 includes a protocol handler 101 for communicating with clients, such as client A 102, a producer, and client B 103, a consumer. A queue manager 104 in the messaging server 100 provides queuing services and divides work.

A matching engine 105 is responsible for allocating messages on a particular destination to appropriate consuming applications. In the point to point (queue) case, this may include allocating messages waiting on a queue to one or more applications that are requesting messages from that queue. In the publish/subscribe (topic) case, this may include checking the topic on which a message is published against a set of active subscriptions and adding messages to the subscriptions that are interested in receiving messages from that topic.

The messaging server 100 includes a monitoring component 110 that gathers and maintains metrics 111, 112, 113 from inside and outside the messaging server 100 and invokes the required business logic that determines if and when a particular business rule is required. Metrics from inside may include metrics 111 from the queue manager 104 and metrics 112 from the matching engine 105 such as queue depths, consumption rates, production rates, etc. External metrics 113 may include central processing unit (CPU) utility, disk space, etc.

A set of policies 121 are defined with actions to be applied when a policy is used. The set of policies 121 may be maintained independently of the runtime, for example, using a high level business tool. The set of policies 121 may define a quality of service (QoS) policy, for example, customer specific, environment specific, etc., that may be applied across a set of messages.

A set of triggers 122 are defined conditions that when monitored specify a policy 121 to be applied. Example triggers include a queue depth, disk space, CPU usages, etc.

A determining component 120 consumes the set of policies 121, the set of triggers 122, and the data from the monitoring component 110. The determining component 120 determines when trigger conditions 122 are met that specify a policy 121 to be fired by applying actions 123 and to which messages the policy 121 is to be applied. Actions 123 resulting from a policy 121 may include downgrading the QoS or deleting a particular set of messages.

Points of queuing on which the determining component 120 may apply actions may include:
A queue;
A durable subscription;
A non-durable subscription;
Transmission streams between components in a distributed messaging system, where messages are temporarily stored pending transfer to another messaging process in situations where that process may be unavailable (for example, as part of a "store and forward" pattern);
Message buffers that are used outside the basic functional requirements of queuing, for example, a "read ahead" buffer that is maintained in the system process of the consuming application to optimize performance during receipt of messages; and
A group of the previously mentioned items, for example, a number of related or unrelated queues.
Triggers 112 may include:
The size of the set of messages that are waiting (for example, the queue or subscription depth, which may indicate that an application is not consuming messages fast enough—or at all).
A manually initiated request (for example, a user makes a request using a user interface or command-line infrastructure such as a WebSphere Application Server (WAS) Managed Bean (MBean).
A resource constraint such as memory or disk usage.
A time interval—scheduled alarm on a one-off or repeating basis (for example, check the policy every 10 minutes).
Actions 123 that may be applied may include:
Deleting one or more messages from a point of queuing.
Upgrading or downgrading the QoS or one or more messages to make them more or less likely to be delivered.
Preventing further messages from arriving (for example, "put disable" the queue or enable pacing of the producer(s)).
Examples of policies 121 that may be defined may include the following.
Deciding which messages to discard when resources are running low (for example, delete every other message, delete oldest messages first).
Lowering the quality of service used for transmitting a stream of messages to the consumer (for example, moving from persistent to non-persistent using fewer resources to transfer the messages).
Combining the above two approaches to decide to downgrade only certain of the messages (for example, every other message or all but the newest messages).
Deciding what to spill when a queue is full (for example, spill the oldest messages first, throw and exception on the new message, or delete messages to make room for the new message).
These example policies may be applied on the producer side, the consumer side, or inside the system (messaging server 100) itself.

Given a messaging provider, the described system includes the ability to define a quality of service policy that acts across a set of messages rather than applying to an individual message as is traditionally the case.

Figure 2:
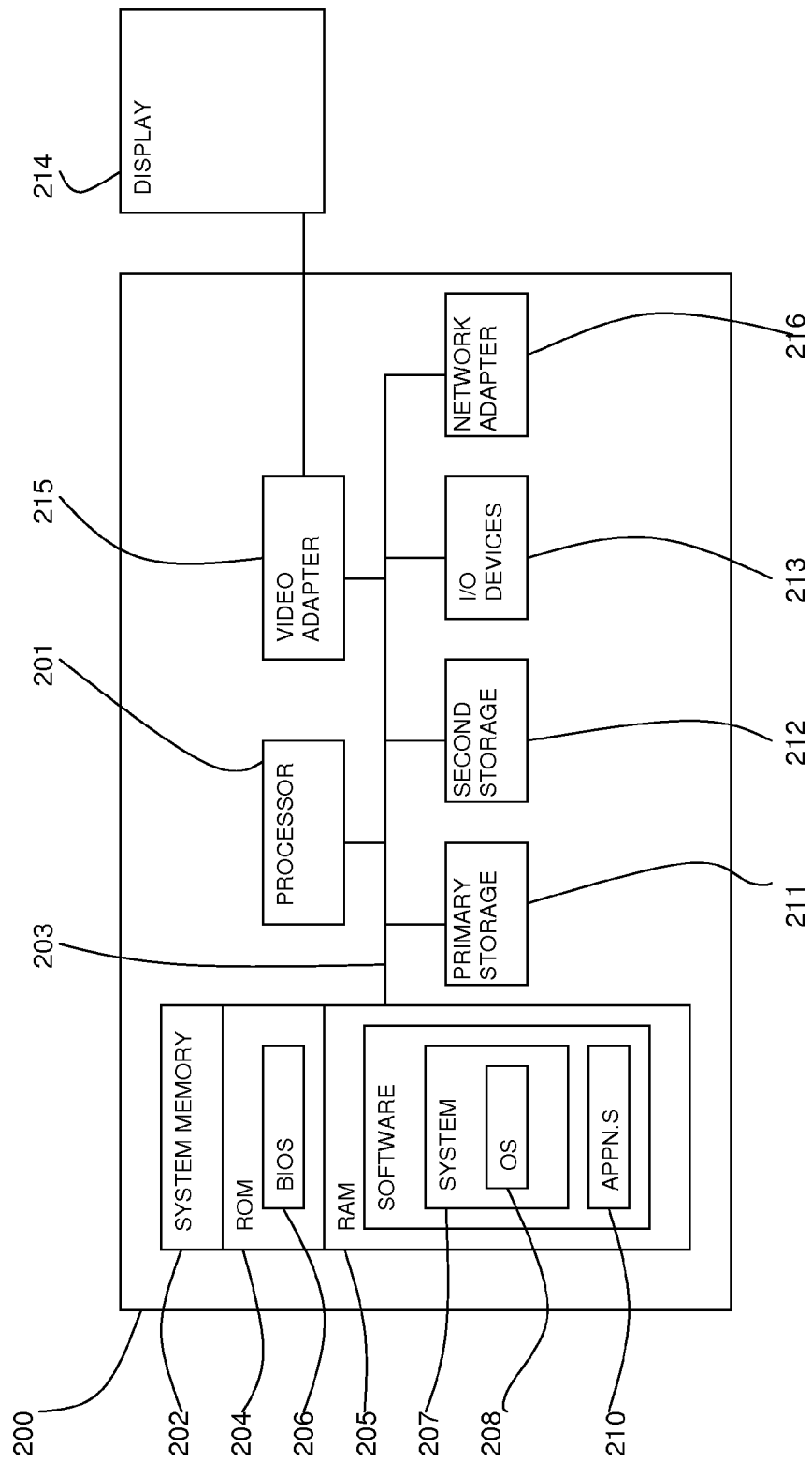
FIG. 2 is a block diagram of a computer system in which the present invention may be implemented.

Referring to FIG. 2, an example system for implementing aspects of the invention includes a data processing system 200 suitable for storing and/or executing program code including at least one processor 201 coupled directly or indirectly to memory elements through a bus system 203. The memory elements may include local memory employed during actual execution of the program code, bulk storage, and cache memories that provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The data processing system 200 may also include a primary storage means 211, such as a magnetic hard disk drive, and secondary storage means 212, such as a magnetic disc drive and an optical disc drive. The drives and their associated computer-readable media provide non-volatile storage of computer-executable instructions, data structures, program modules and other data for the data processing system 200. Software applications may be stored on the primary and secondary storage means 211, 212 as well as the system memory 202.

The data processing system 200 may operate in a networked environment using logical connections to one or more remote computers via a network adapter 216.

Input/output devices 213 may be coupled to the system either directly or through intervening I/O controllers. A user may enter commands and information into the data processing system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3:
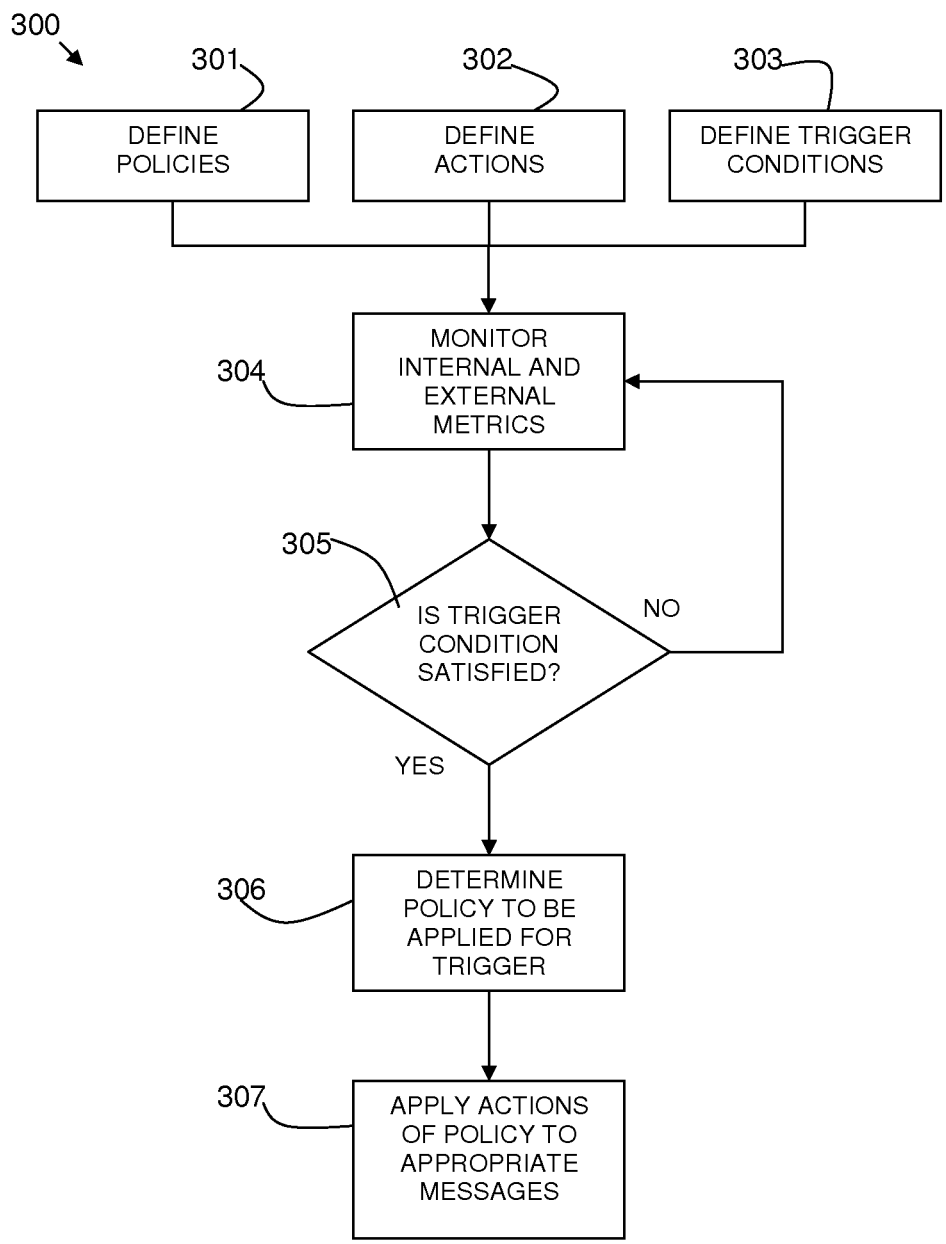
FIG. 3 is a flow diagram of a method in accordance with the present invention.

Referring to FIG. 3, a flow diagram 300 shows the described method. Policies are defined at 301 and actions to be taken for a policy are also defined at 302. Trigger conditions for a policy are defined at 303.

Internal and external metrics of a messaging system are monitored at 304. It is determined when a defined trigger condition is met at 305. If a trigger condition is not met, the monitoring at 304 continues. If a trigger condition is met, the policy to be applied for the trigger condition is determined at 306. The actions for the policy to be applied for the trigger condition are applied at 307 to the appropriate messages as defined in the policy.

The following are use cases that may be implemented using this described system.

A stored list of messages represents notification of, or requests for updates to a resource, where only the final state of the resource is important. When a trigger condition is observed, the list of messages may be optimized to remove messages that have been superseded by later messages. An example of this would be score updates for sports matches.

If the message represents a full status update of the resource then all messages except the latest may be removed (degenerates to retained publications in the publish/subscribe case).

If the message represents a partial update, then the set of messages in the point of queuing may be examined to see which ones may be removed. This may make use of metadata from the message to identify different types of update (e.g., a header field value) or some deep inspection of the body content of the message to establish what is being updated.

A stored list of messages represents notification of, or requests for, updates to a resource, where the historical trend of the information is important, but the resolution/frequency of the updates may be lowered in response to trigger conditions such as resource contention. An example would be an application that draws a graph of a stock price over time.

Discard or modify QoS of a message so that a maximum of one message is retained per time interval (for example, one message per minute).

Discard or modify QoS of a message so that one message is retained per "N" messages in the stream (for example, keep every tenth (10th) message).

Discard messages that are not significantly different from the previous update (for example, discard those messages where the stock price differs from the previous message by less than one cent ($0.01)).

A service is only capable (or permitted) to fulfil a fixed number of requests.

Ticket Sales application, in which only the first five hundred (500) requests that arrive may be honored, and the rest will be discarded before they are processed.

Variation on the above with a different mechanism to pick which "N" requests will be retained.

The previous use cases deal with reduction of the quality of service, but there are also cases where a user may wish to upgrade the quality of service.

A fragile client application connects over an unreliable connection such that messages intended for the client are almost never successfully processed. The system may observe this condition and dynamically upgrade the protocol by which the message is transmitted to provide additional reliability.

If a queue is full, rather than allowing a put message operation to fail, the described method may implement a number of policies.

Delete the oldest message from the queue and allow for the put message operation to succeed.

Delete one or more messages (which may not be the oldest) to allow the put message operation to succeed. For example, in the manner described in the previous use cases.

After a message has been stored by a component of the system, its QoS may be modified as part of the application of a policy that is executed when a specified trigger condition is detected.

Figure 4:
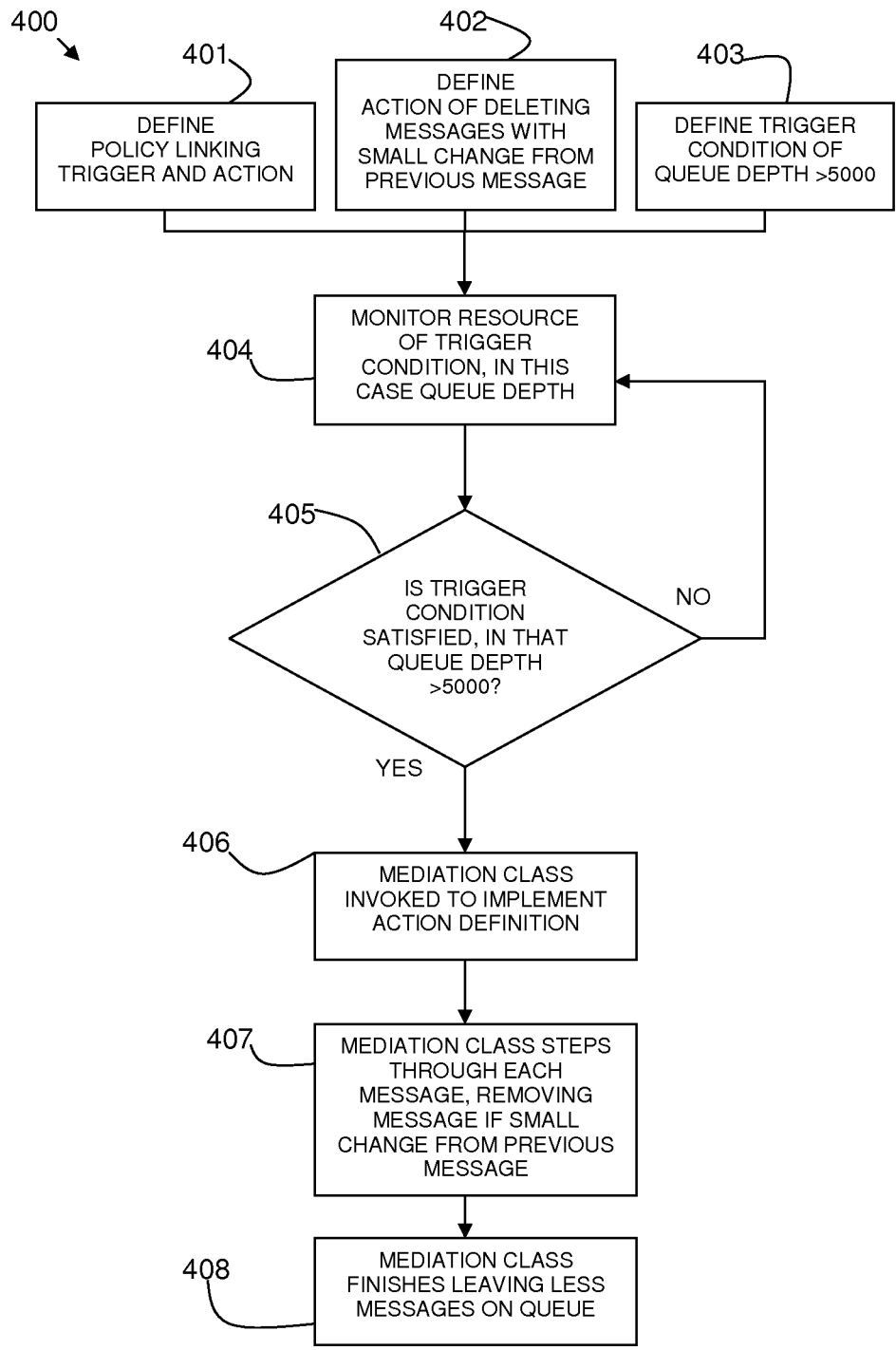
FIG. 4 is a flow diagram of a method of an example in accordance with the present invention.

Referring to FIG. 4, a flow diagram 400 shows an example method of one of the examples given above of a stored list of messages that represents notification of, or requests for, updates, to a resource, where the historical trend of the information is important, but the resolution/frequency of the updates may be lowered in response to trigger conditions such as resource contention. The example method discards messages that are not significantly different from the previous update.

A trigger condition is defined at 403, in this example, where the trigger condition is that the total depth of the queue is greater than five thousand (5000) messages.

An action is defined at 402, in this example, to iterate through the messages in the queue from oldest to newest, and to delete any messages for which the stock price contained within the message is different to the previous message remaining on the queue by less than one cent ($0.01).

A policy is defined at 401 that links the defined trigger condition with the defined action.

The resource specified in the trigger condition is monitored at 404; in this case, the total depth of the queue is monitored.

It is determined at 405 if the trigger condition is fulfilled (i.e., the queue depth becomes larger than five thousand (5000) messages). When this occurs, a "mediation" class is invoked at 406 that implements the action definition.

The mediation class steps at 407 through each message in turn, removing it from the queue if the stock price is less than one cent ($0.01) different from the previous message remaining on the queue. When the mediation class is finished at 408 iterating through the messages there are less messages on the queue for the consuming application to consume.

The following describes in detail an example embodiment for implementing the disclosure.

The system patterns, triggers, and actions described above may be defined at a business level. A user interface form may be provided that gives a set of drop-down options to choose from, which are then applied to the points of queuing.

An example includes:

Application pattern: Messages represent self-contained updates that contain the partial state of a resource:

Trigger condition: Number of requests waiting on the queue exceeds "N";

Action: Retain only the latest message for each update type;

Update types are distinguished using the value of "XYZ" header field.

Based on this configuration interface, a set of standard implementations may be developed to take the appropriate action.

The implementation of these standard options (and any custom implementations that are developed by the user for situations that are not covered by the standard templates) may use a mediation-like interface to apply the required action.

Traditional mediation allows for use cases, such as transformation and routing of a single message when the message arrives at a point of queuing (for example, a Queue). The described system provides the ability to act on the set of queued messages that have already arrived, thus enabling a richer set of use cases to be implemented.

An example interface for this system level mediation may be as follows:

```
/**
 * Implemented by policy actions creators to apply the specified changes
 * to the list of queued items
 * @param items
 * @param queueInfo
 */
public void processQueuedItems(List<Item> items, Object queueInfo);
```

The "queueInfo" object provides access to metadata about the point of queuing, and potentially the ability to modify the behaviour of the queue (for example, to put-disable it).

The "Item" is an abstract representation of the queued object that enables manipulation to be performed on it without having to load the whole message into memory. A possible interface definition is shown below, in which it is possible to delete the message without fully loading it first. This gives an efficient (lazy loading) implementation for policies that express their actions in terms like "keep only the latest message" or "keep every 5th message," etc. Similarly, it may be desirable to be able to load the message metadata (for example, header fields) without loading the body content.

```
/**
 * Representation of the queued item that enables actions to be
 * taken on it. Also enables the actual Message to be obtained
 * in order for deeper analysis to be carried out.
 */
public interface Item
{
    /**
     * Call this method to have the message removed from the queue
     */
    public void deleteItem( );
    /**
     * Call this method to modify the quality of service for the message
     * @param newQOS
     */
    public void modifyQOS(Object newQOS);
    /**
     * Get the message from the queue to enable deeper inspection to be
     * carried out
     * @return Message
     */
    public Message getMessage( );
}
```

The exact signature of the method to modify the QoS of a message is dependent on the messaging provider to which the system is applied, as different providers have different QoS options.

A policy system may be provided as a service to a customer over a network.

The present subject matter may take the form of an entirely hardware embodiment, an entirely software embodiment or an embodiment containing both hardware and software elements. In a preferred embodiment, the present subject matter is implemented in software, which includes but is not limited to firmware, resident software, microcode, etc.

The present subject matter may take the form of a computer program product accessible from a computer-usable or computer-readable storage medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications may be made to the foregoing without departing from the scope of the present subject matter.

What is claimed is:

1. A computer program product for application of system level policy in message oriented middleware comprising a computer-readable storage device in which computer-executable instructions are stored, which instructions, when executed by a computer, cause the computer to:
    define one or more policies to be applied to a set of one or more messages in the message oriented middleware;
    monitor metrics of the message oriented middleware;
    initiate application of a policy in response to a trigger condition being satisfied; and where application of the policy applies actions across the set of one or more messages, applies the defined policy to an abstract representation of at least one message to allow manipulation of the at least one message without loading the whole at least one message into memory, and the abstract representation of the at least one message allows only loading of metadata of the at least one message.

2. The computer program product of claim 1, where the defined policy defines a quality of service (QoS) policy.

3. The computer program product of claim 1, where the defined policy comprises one or more trigger conditions for activating the defined policy, one or more actions to be applied, and a link between the one or more trigger conditions and the one or more actions.

4. The computer program product of claim 1, where the computer-executable instructions, when executed by the computer, cause the computer to apply actions at selected points in the message oriented middleware comprising at least one of: at messages stored on a queue, at durable or non-durable subscription to messages, at transmission streams between components in a distributed messaging system, message buffers, and a group of the above points.

5. The computer program product of claim 1, where the defined policy modifies a quality of service (QoS) of at least one of the set of one or more messages after the at least one of the set of one or more messages is stored in response to the trigger condition being satisfied.

6. The computer program product of claim 1, where the computer-executable instructions, when executed by the computer, cause the computer to apply system level mediation to the set of one or more messages.

7. The computer program product of claim 1, where the computer-executable instructions, when executed by the computer, cause the computer to apply the defined policy by access to metadata about a point of queuing of at least one message within a queue and an ability to modify behavior of the queue.

8. The computer program product of claim 1, where, in causing the computer to monitor the metrics of the message oriented middleware, the computer-executable instructions, when executed by the computer, cause the computer to monitor internal and external metrics.

9. A system for application of system level policy in message oriented middleware, comprising:
   a memory that stores a defined policy; and
   a processor that executes:
      a messaging server;
      a monitoring component that monitors metrics of the message oriented middleware; and
      a determining component that initiates application of the defined policy in response to a trigger condition being satisfied; and
   where application of the defined policy applies actions across a set of one or more messages, the determining component applies the defined policy to an abstract representation of at least one message to allow manipulation of the at least one message without loading the whole at least one message into the memory, and the abstract representation of the at least one message allows only loading of metadata of the at least one message.

10. The system of claim 9, where the defined policy defines a quality of service (QoS) policy.

11. The system of claim 9, where the defined policy comprises one or more trigger conditions for activating the defined policy, one or more actions to be applied, and a link between the one or more trigger conditions and the one or more actions.

12. The system of claim 9, where the determining component applies actions at selected points in the message oriented middleware comprising at least one of: at messages stored on a queue, at durable or non-durable subscription to messages, at transmission streams between components in a distributed messaging system, message buffers, and a group of the above points.

13. The system of claim 9, where the defined policy modifies a quality of service (QoS) of at least one of the set of one or more messages after the at least one of the set of one or more messages is stored in response to the trigger condition being satisfied.

14. The system of claim 9, where the determining component applies system level mediation to the set of one or more messages.

15. The system of claim 9, where the determining component applies the defined policy by access to metadata about a point of queuing of at least one message within a queue and an ability to modify behavior of the queue.

16. The system of claim 9, where the monitoring component monitors metrics of the message oriented middleware comprising internal and external metrics.

\* \* \* \* \*